Patented Apr. 27, 1926.

1,582,475

UNITED STATES PATENT OFFICE.

GEORG KRÄNZLEIN, HEINRICH GREUNE, ROBERT SEDLMAYR, AND HEINRICH VOLLMANN, OF HOCHST-ON-THE-MAIN, GERMANY, ASSIGNORS TO GRASSELLI DYESTUFF CORPORATION, OF NEW YORK, N. Y., A CORPORATION OF DELAWARE.

VAT DYESTUFF AND PROCESS OF MAKING SAME.

No Drawing.   Application filed November 27, 1925.  Serial No. 71,709.

*To all whom it may concern:*

Be it known that we, GEORG KRÄNZLEIN, HEINRICH GREUNE, ROBERT SEDLMAYR, and HEINRICH VOLLMANN, citizens of Germany, residing at Hochst-on-the-Main, Germany, have invented certain new and useful Improvements in Vat Dyestuffs and Processes of Making Same, of which the following is a specification.

We have found that by condensing benzanthrones with the anhydrides of aromatic acids, for instance anhydrides of mono- or di-carboxylic acids with aluminium chloride there are obtained by way of the corresponding ketone- or keto-ortho-carboxylic acids products which also constitute dyestuffs of good properties as to fastness. When using monocarboxylic anhydrides the new condensation products are probably dibenzpyrenequinones and when using dicarboxylic anhydrides phthaloyl- or naphthoylbenzanthrones.

The condensation product obtained from benzanthrone and phthalic anhydride is probably the 2.3-(Bz)phthaloylbenzanthrone. It forms a yellow powder which dissolves in concentrated sulfuric acid to a yellowish-red solution. The vat prepared therefrom with caustic soda and hydrosulfite has, when cold, a green color, when warm a red color: From the cold vat cotton is dyed a green tint which on exposure to the air becomes brilliant yellow.

When condensing benzanthrone with benzoic acid anhydride there is obtained, probably by way of the corresponding banzoylbenzanthrones, the 4.5.8.9-dibenzpyrenequinone.

In the same manner as the benzanthrone itself its derivatives, for instance α-hydroxybenzanthrone, α-chlorbenzanthrone or the industrially manufactured β-methylbenzanthrone or the like, may be fused with aromatic acid anhydrides or their substitution products and aluminium chloride as a condensing agent, whereby also dyestuffs are obtained.

The following examples serve to illustrate our invention the parts being by weight:

(1) 10 parts of benzanthrone are mixed and stirred with 100 parts of sodium aluminiumchloride at 125° C. whereby a thin liquid melt is obtained into which 25 parts of benzoic anhydride are introduced. The molten mass is stirred for about 15 hours at 140° C. and then treated by boiling it first with water, then with hydrochloric acid and finally again with water. The dyestuff may be isolated from the raw product by reducing it to a vat and is very likely identical with the 4.5.8.9-dibenzpyrenequinone. The residue which is not capable of being reduced to a vat contains a body which crystallizes from xylene in the form of yellow, brilliant laminæ melting at 205° C. It dissolves in concentrated sulfuric acid to a solution with an intense green fluorescence and very probably constitutes a dibenzoylbenzanthrone.

(2) 23 parts of benzanthrone, 160 parts of aluminium chloride and 70 parts of benzoic anyhyride are mixed together and stirred at 125–130° C. for 48 hours while passing oxygen into the melt. This fusion is decomposed in the manner indicated in example 1 and the resulting dyestuff is purified by means of chlorine solution.

(3) 144 parts of dry sodium benzoate, 140 parts of benzoyl chloride, 100 parts of benzanthrone and 800 parts of aluminium chloride are fused together and this fusion is stirred at 130° C. for 48 hours while introducing oxygen.

The further operations and isolation of the dyestuff formed is carried out in the manner indicated in the foregoing examples.

(4) 68 parts of benzanthrone, 90 parts of phthalic anhydride and 150 parts of aluminium chloride are intimately triturated and heated together to about 140–160° until the formation of the dyestuff is complete. After having decomposed and extracted the fusion by boiling it with much water and dilute hydrochloric acid, the mass is filtered and the residue is treated with dilute caustic soda solution in order to eliminate any remainder of unaltered phthalic anhydride and benzanthrone phthaloyic acid. The yellowish-brown paste thus obtained may either be directly used as dyestuff or, which is preferable, it may previously be purified according to one of the usual methods by a treatment with a solution of sodium hypochlorite or reduction and afterwards introduction of air. The dyestuff when reduced with caustic soda solution and hydrosulfite gives a beautiful green vat which dyes cotton a green shade which, on exposure to the air, becomes brilliant yellow of excellent properties as to fastness.

(5) 123 parts of α-hydroxybenzanthrone, 150 parts of phthalic anhydride and 200 parts of aluminium chloride are intimately mixed and heated to about 150–170° C. until the formation of the dyestuff is complete. The fusion is then worked up as indicated in example 4.

The dyestuff thus obtained also dyes from a cold green vat cotton on exposure to the air beautiful yellow tints.

(6) 73 parts of β-methylbenzanthrone of melting point 199° C., 140 parts of 3.6-dichlorophthalic anhydride and 200 parts of aluminium chloride are intimately triturated and heated together to 160–180° C. until the formation of the dyestuff is complete.

The fusion is worked up as indicated in example 4. The dyestuff thus obtained also dyes cotton yellow tints.

We claim:

1. Process of producing vat dyestuffs, consisting in fusing a benzanthrone with an anhydride of an aromatic carboxylic acid in the presence of a condensing agent.

2. Process of producing vat dysetuffs, consisting in fusing a benzanthrone with benzoic anhydride in the presence of a condensing agent.

3. Process of producing vat dyestuffs, consisting in fusing a benzanthrone with an anhydride of an aromatic carboxylic acid in the presence of a condensing agent and an atmosphere of oxygen.

4. Process of producing vat dyestuffs, consisting in fusing a benzanthrone with benzoic anhydride in the presence of a condensing agent and an atmosphere of oxygen.

5. As new products the dyestuffs of the following formula:

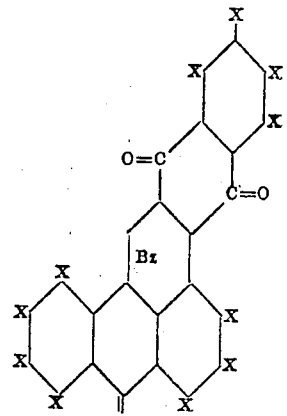

X being hydrogen or any substituent.

6. As new products, the dyestuffs, substantially identical with the products obtainable by fusing a benzanthrone with an anhydride of an aromatic carboxylic acid in presence of a condensing agent.

In testimony whereof, we affix our signatures.

GEORG KRÄNZLEIN.
Dr. HEINR. GREUNE.
ROBERT SEDLMAYR.
HEINRICH VOLLMANN.